(12) United States Patent
Maher et al.

(10) Patent No.: US 8,213,147 B2
(45) Date of Patent: Jul. 3, 2012

(54) OVER-CURRENT PROTECTION CIRCUIT WITH FOLDBACK CAPABILITY

(75) Inventors: Gregory A. Maher, Cape Elizabeth, ME (US); Hrvoje Jasa, Scarborough, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 200 days.

(21) Appl. No.: 12/814,775

(22) Filed: Jun. 14, 2010

(65) Prior Publication Data
US 2010/0315750 A1 Dec. 16, 2010

Related U.S. Application Data

(60) Provisional application No. 61/187,313, filed on Jun. 16, 2009.

(51) Int. Cl.
*H02H 9/08* (2006.01)
(52) U.S. Cl. .................. 361/93.1; 361/93.9

(58) Field of Classification Search .......... 361/93.1, 361/93.7–93.9
See application file for complete search history.

(56) References Cited

U.S. PATENT DOCUMENTS

| | | | | |
|---|---|---|---|---|
| 5,909,112 A | * | 6/1999 | Kiyota et al. | 323/315 |
| 7,218,496 B2 | * | 5/2007 | Kitagawa | 361/93.9 |
| 2010/0117608 A1 | * | 5/2010 | Tseng | 323/272 |

* cited by examiner

*Primary Examiner* — Danny Nguyen
(74) *Attorney, Agent, or Firm* — Schwegman, Lundberg & Woessner, P.A.

(57) ABSTRACT

An over-current protection circuit is disclosed that provides a current limit threshold using resistors in the path of a scaled mirror current of a load current. The protective circuit has a first state that passes a supply source to a device, but when the threshold is reached the circuit becomes a feedback circuit that allows only a set final current to be passed to the device. When the load current reaches the threshold, the mirror current reaches a corresponding threshold that triggers a comparator and circuitry that then limits and fold backs the load current.

16 Claims, 3 Drawing Sheets

OVER-CURRENT PROTECTION CIRCUIT WITH FOLDBACK CAPABILITY

The present application claims priority U.S. Provisional Patent Application Ser. No. 61/187,313, filed on Jun. 16, 2009 and is of common title, inventorship and ownership. This provisional application is incorporated herein by reference.

BACKGROUND

In systems where a device is being powered via a computer system or a charging docking system, current overloads may occur.

One type of overload may occur during "hot-plugging" a peripheral device to a computer or a charging docking station by inserting a USB connector (or other types) into a USB port on the computer or charging docking station. To "hot-plug" a peripheral refers to connecting one device to another, or disconnecting the devices from each other without powering down either device.

A USB connector, commonly used for connecting devices, has a power supply voltage, a ground and data. Problems may occur if a misalignment short circuits any connector pins.

For example, when a peripheral device is attached via a USB connector to a power source, say a computer, a short circuit may cause an overload condition where the peripheral device, the power source or cable wires may be damaged.

The present invention is directed toward such problems.

SUMMARY OF THE INVENTION

The following discussion does not initially distinguish among current and/or voltage circuits, or combinations thereof, for comparators, operational amplifiers and feedback paths, as both types may be employed. In illustrative examples herein, however, the voltage versions are described in more detail, but the present disclosure is not to be limited to only voltage circuits.

The present disclosure includes an over-current protective circuit having two states. In a first state, a supply voltage is passed through a turned-on first FET that transfers the supply voltage and a load current to a load device. A smaller, scaled mirror current of the load current is created by sizing a mirror FET transistor, illustratively to $1/10$, $1/20$, $1/50$ or even smaller of the first FET. The two FETs have gates (control nodes) that are tied together and sources that are tied together forming the current mirror. The scaled mirror current may be directed to a comparator, where it is compared to a threshold reference. As the load current rises, the scaled mirror current rises and finally exceed the threshold reference (detected as an overload), and the protective circuit enters the second state.

In the second state a feedback circuit is created that folds back the overload current before it can cause problems.

Illustratively, the scaled mirror current may be directed through a sense resistor to form a feedback signal, in this case a feedback voltage, and the threshold reference is a voltage. The comparator compares these two voltages, and when feedback signal exceeds the reference voltage the second state is entered. The comparator output may turn on a switch that connects the feedback voltage to one input of an operational amplifier. A first reference voltage is connected to the other input of the operational amplifier. The output of the operational amplifier drives the first FET, that was on in the first state, into an analog (linear) state that reduces the voltage and load current to the device. The scaled mirror current is correspondingly reduced, that in turn reduces the feedback voltage until it matches the first reference voltage. At that point the folded back load current is a function of the mirror current, the scale factor and the second reference.

The present disclosure includes an over-current protecting method for a load current, that includes the steps of: scaling a mirror current of the load current; generating sense and feedback signals from the mirror current; comparing the sense signal to a threshold signal and outputting a compare signal therefrom. When the sense signal does not reach the threshold signal, these steps are included: activating a first switch with the compare signal and connecting, via the switch, a first signal to a first input of a control circuit; wherein the control circuit outputs a control output that turns on a first and a second transistor; connecting a first supply voltage to an output and drawing a load current via the turned on first transistor; drawing the scaled, mirror current of the load current via the turned on second transistor; and wherein when the sense signal reaches the threshold signal, outputting an over-current signal, that indicates an overload state. When in the overload state, also referred to herein as state 2, the following steps occur: forming a feedback loop by; deactivating the first switch and activating a second switch from the over-current signal; connecting the feedback signal, via the second switch, to the first input of the control circuit; comparing the feedback signal to a first reference signal, wherein the control circuit output drives the first and the second transistors into an analog condition; and lowering the load and scaled mirror currents until the feedback signal matches the first reference signal.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
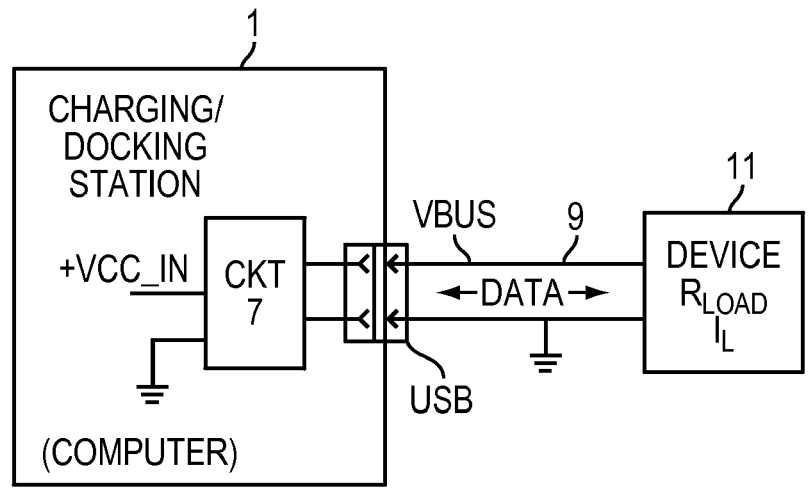
FIGS. 1A, 1B and 1C are systems illustrating applications of the present disclosure.
Figure 1B:
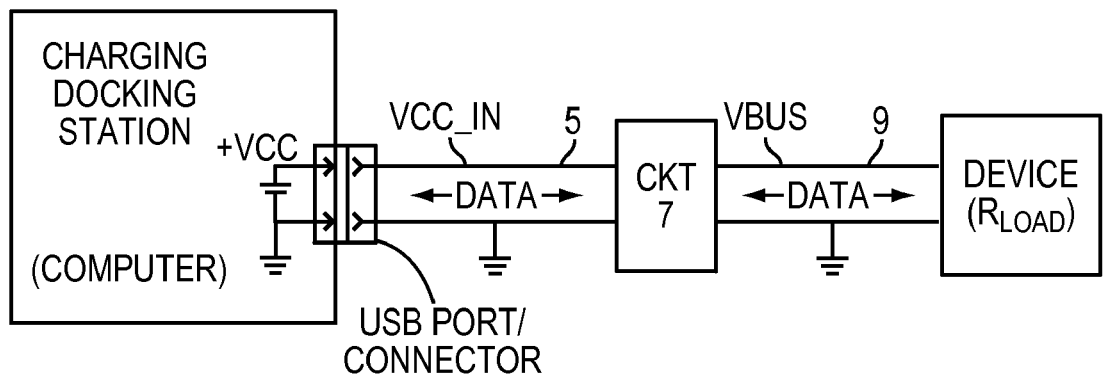
Figure 1C:
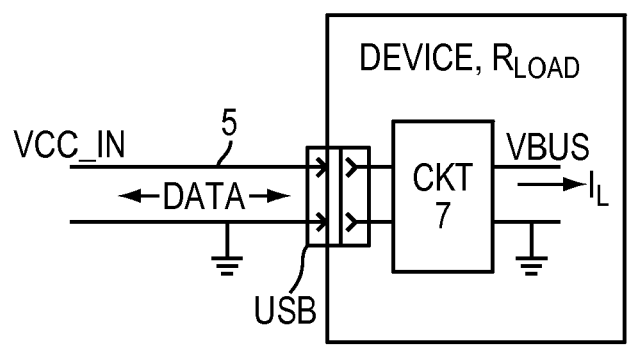

FIG. 1B illustrates a system that may utilize the present disclosure. Here a docking station (charging system) or computer 1 has a power source, VCC, that connects to a USB port with an attached mating USB connector. The USB cable 5 carries the power source as VCC_IN that is meant to power the device 11, a ground and bidirectional data carrying wires. A protective circuit, CKT 7, allows hot plugging of the device 11. CKT 7 outputs a VBUS, a ground and bidirectional data wires to the device 11 via the cable 9. In some examples, FIG. 1A, the CKT 7 may be housed in the docking station 1, and the CKT 7 and the device 11 may be housed together, FIG. 1C, and connect together with no cables.

Figure 2:
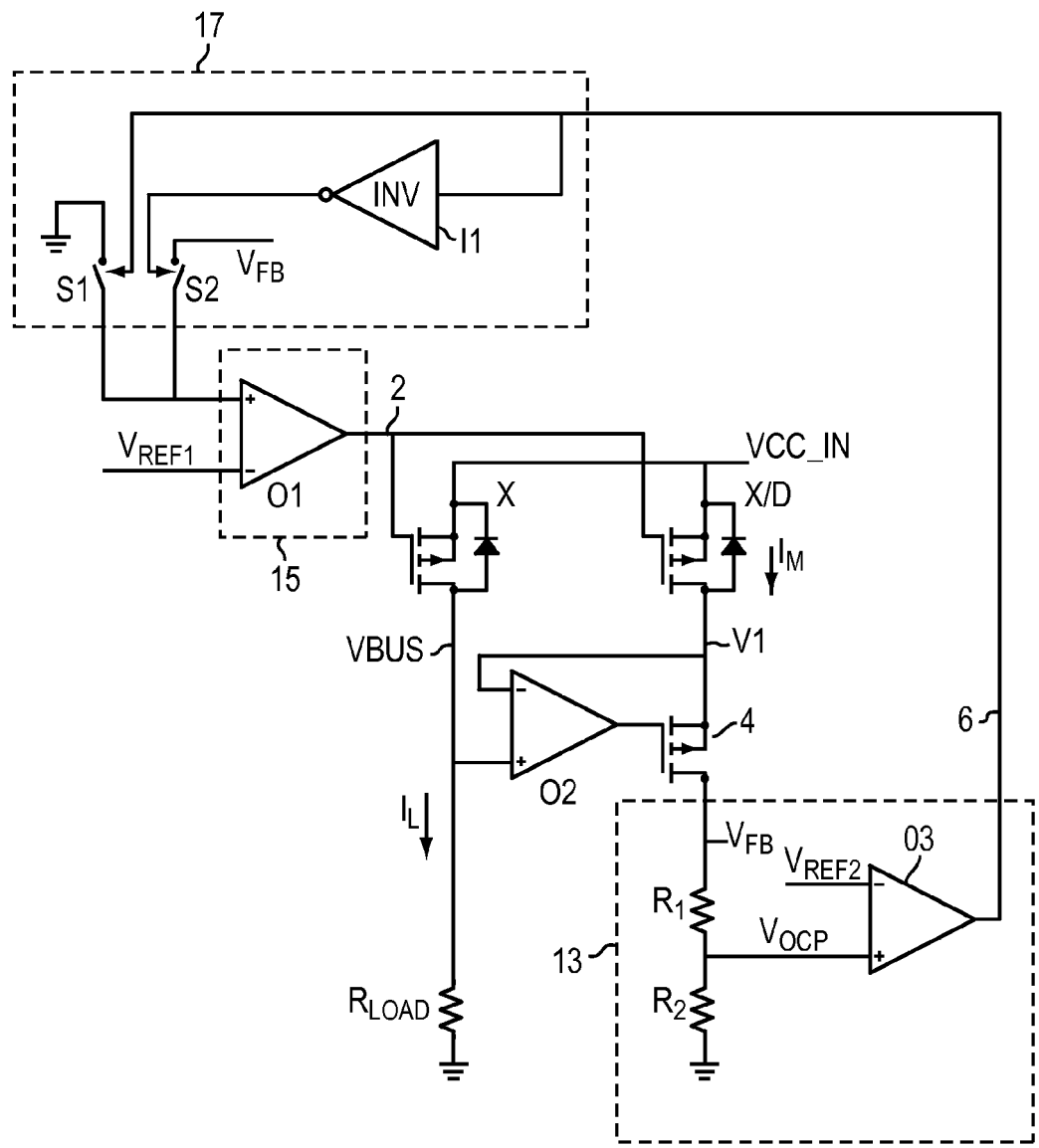
FIG. 2 is a representative circuit embodying the present invention.

Illustratively, FIG. 2 is a circuit diagram of the CKT 7 with the data wires not shown. The VCC_IN is from the USB cable 5, and VBUS is fed via the cable 9 from the CKT 7 to the device 11. CKT 7 is shown and discussed below using p-type FETs X, X/D and FET 4, however, CKT 7 may be implemented using n-type FETs, bipolar and/or hybrid transistors. R$_{LOAD}$ represents the load presented by the device 11, and I$_L$ is the corresponding load current.

CKT 7 has a sense circuit 13, a control circuit 15, a switch assembly 17, the n-type FETs, an RLOAD that represents the load presented by a device 11, and the operational amplifier O2.

VCC_IN is connected ("connection" herein includes having intervening components that little affect the function) to the sources of current mirror connected FETs X and X/D. FET X/D is a size scaled version of FET X, and the mirrored current is in FET X/D is correspondingly size scaled. The output 6 of comparator O3 drives the single pole switch S1, and the inverter, INV, drives the single pole switch S2 with the inverse of the output 6. S1 and S2 cannot be both off or both on at the same time.

CKT 7 has two states or modes. In a first state, the normal state, VCC_IN is delivered to the load $R_{LOAD}$ as VBUS. A second state is an overload condition where the load current $I_L$ is too high. In the second state the CKT 7 forms a feedback loop that folds back $I_L$ to a controlled level.

In the first state, $R_{LOAD}$ draws $I_L$ from VBUS via the on FET X. FET X is fully on so that VBUS about equals VCC_IN. During this state S1 is closed presenting a ground signal to the non-inverting (+) input of operational amplifier O1, and S2 is open. The other input to O1 is a positive voltage reference, VREF1, so that an O1 low output drives FET X and X/D fully on.

Still referring to FIG. 2, the mirror current $I_M$ travels through R1 and R2 forming VFB and VOCP. $VREF_2$ is set higher than VOCP, and the output 6 of comparator O3 is low. That low closes S1, and, via the inverter INV, opens S2.

A closed S1 presents a ground to the non-inverting (+) terminal of operational amplifier O1. VREF1 is a positive reference voltage and the output 2 of O1 is low turning on FET X and FET X/D. FET X and FET X/D are p-channel devices that turn on when the Vgs is more negative than the device threshold. FET X and FETX/D form current mirrors wherein $I_M$ is a mirror current of $I_L$. As discussed above, $I_M$ is smaller (by the factor D) than $I_L$. The operation of O2 will control FET 4 (also a p-type) to maintain V1 equal to VBUS, and, in the first state, VBUS is about equals to VCC_IN.

The second state, an overload condition, of CKT 7 occurs when $R_{LOAD}$ becomes small and $I_L$ increases, the mirror $I_M$ will increase proportionally. At some point VOCP will exceed VREF2 and O3 output 6 will go high opening S1, and via INV closing S2. In this condition, $V_{FB}$ is presented to the non-inverting (+) input of O1 via S2. CKT 7, in state 2, forms a negative feedback path through the current mirror FET X/D, VFB, O1 and O2. This feedback path forces $V_{FB}$ to be equal to VREF1.

The feedback operation may be described as follows: If VFB is higher than VREF1, O1 output, item 2, goes higher causing FET X to reduce $I_L$ and FETX/D to reduce IM. VFB is reduced driving it towards VREF1. If VFB is lower than VREF1, O1 output, item 2, goes lower causing FET X to increase and FETX/D to increase IM. VFB is raised driving it towards VREF1. The net result is the VFB finally equal VREF1. Note care must be taken to ensure CKT 7 is stable.

Since $I_M$ is VREF1/(R1+R2), and $I_L=DI_M$, then it follows that $I_L$ is a function of VREF1. VREF1 can be used to set the reduced $I_L$.

Figure 3:
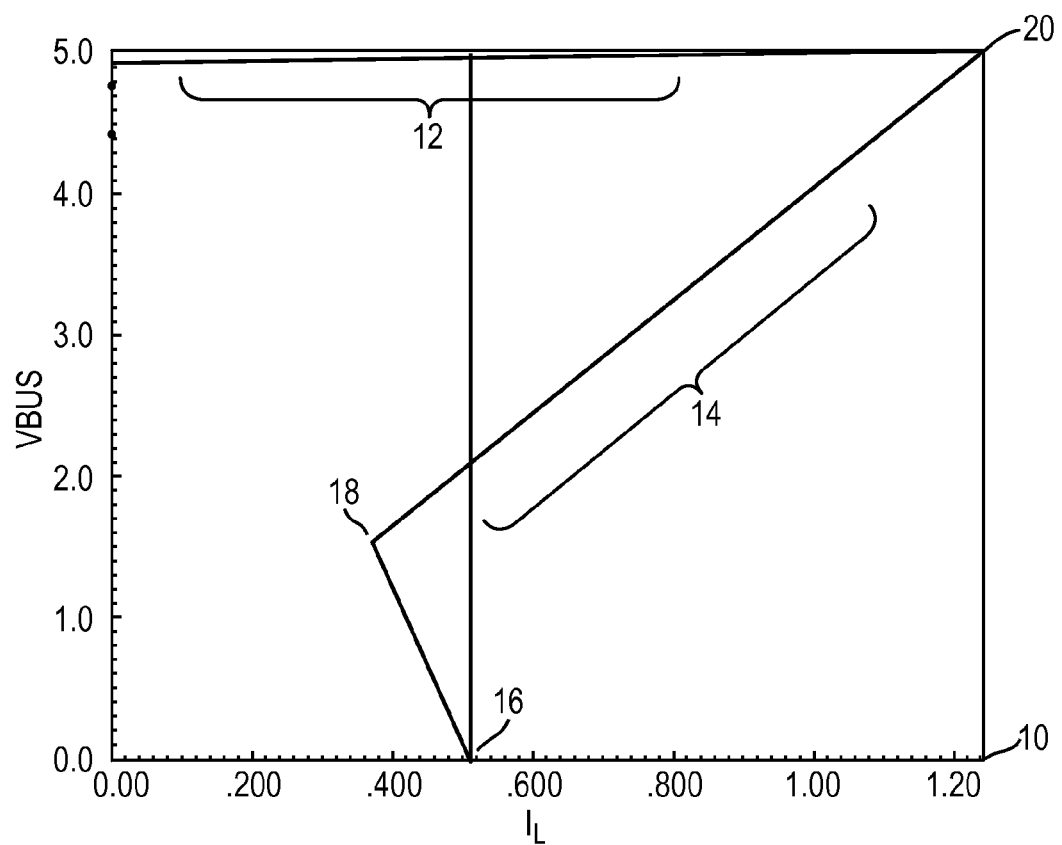
FIG. 3 is a graph of the foldback voltage/current operation of an embodiment of the present invention.

FIG. 3 illustrates the above operation of CKT 7, where the current $I_L$ reaches about +1.2 amps 10 with VBUS at +5V, item 20. The components are arranged such that these voltage and current conditions activate the foldback protection described above. Reference item 12 defines the normal conditions referred to above, and the reference item 14 defines the foldback operation. Here the final state 16 is VBUS at +0.0V and Iload at 0.5 Amps. In this case the device may have a current sink to a negative voltage source, not shown.

The reference 18 traces the actual foldback current/voltage path for the components used in a particular embodiment. In other embodiments the shape of the foldback current/voltage path 14 and the final foldback current $I_L$ 16 may be different.

In particular, the final foldback current 16 in the above example may be set by control of D, VREF1 and R1 and R2, as follows:

The final foldback current, item 16, is $I_L$=D(VREF1)/(R1+R2). Where D is the size proportion factor between FET X and X/D. The foldback point 20 in FIG. 3 can be set by VREF2, in concert with the other components R1, R2, D, etc.

What is claimed is:

1. An over-current protection circuit having a first state and a second state, the over-current protective circuit comprising:
    in the first state:
    a first transistor having a first control node, wherein, when the first transistor is on, it connects a first supply voltage to an output that draws a load current through the first transistor;
    a second transistor having a second control node, wherein the second transistor outputs a scaled mirror current of the load current;
    a control circuit having first and second inputs; the first input connected to a reference input, the control circuit having a control output connected to the first and the second control nodes;
    a sense circuit that compares the scaled mirror current to a predetermined threshold, wherein when the predetermined threshold is not reached, an output of the sense circuit activates a switch assembly that connects a first signal to the control circuit second input, wherein the control output drives the first and the second transistors on;
    wherein when the predetermined threshold is reached, the over current protection circuit assumes the second state, wherein when in the second state:
    a feedback loop exists where the scaled mirror current connects to the sense circuit, the output of the sense circuit now activates the switch assembly to connect a feedback signal, generated from the scaled mirror current, to the control circuit second input signal, wherein the control output drives the first and second switches into an analog condition, wherein the load current and the scaled mirror currents are lowered until the feedback signal matches the reference input.

2. The over-current protection circuit of claim 1 wherein the sense circuit comprises:
    a resistor through which the scaled mirror current flows creating the feedback signal;
    a comparator with an input connected to the feedback signal, and
    a second reference signal connected to another comparator input; wherein the second reference defines the predetermined threshold.

3. The over-current protection circuit of claim 2 wherein the resistor comprises a first and second resistors, wherein the feedback signal is divided forming an intermediate signal, and wherein the intermediate signal is connected to the comparator input.

4. The over-current protection circuit of claim 1 wherein the switch assembly comprises:
    a first single pole switch;
    a second single pole switch;
    an inverter having an input and an output, and
    wherein the inverter output is connected to activate the second switch, and wherein the sense circuit output is connected to activate the first switch and to the inverter input; such that one or the other of the first and second switches is activated and the other is not activated.

5. The over-current protection circuit of claim 1 wherein the switch assembly comprises:
   a first single pole double throw switch;
   the sense circuit output connected to activate the single pole double throw switch; wherein when in the first state the first signal is connected to the control circuit second input, and when in the second state the feedback signal is connected to the control circuit second input.

6. The over-current protection circuit of claim 1 wherein the control circuit comprises:
   an operational amplifier; wherein in the first state the second input, a non-inverting input, is at ground and the first input, an inverting input, is at a positive reference voltage; wherein the control output, the operational amplifier output, is low, and that low signal turns on the first and second transistors.

7. The over-current protection circuit of claim 1 wherein the first and the second transistors are p-type enhance transistors with their sources connected to the first supply voltage.

8. The over-current protection circuit of claim 1 further comprising an operational amplifier with its non-inverting input connected to the output, its inverting input connected to the drain of FET X/D and the source of a third FET; the operational amplifier output connected to the gate of the third FET, and the drain of the third FET is connected to the senses circuit; wherein the scaled mirror current travels through the third FET.

9. An over-current protection circuit having a first state and a second state, the over-current protective circuit comprising, in the first state:
   a first n-type FET with a first gate, wherein, when on, it connects a first supply voltage to an output that draws a load current through the first n-type FET;
   a second n-type FET having a second gate, wherein the second n-type FET outputs a mirror current scaled by a factor D of the load current;
   an operational amplifier having non-inverting and inverting inputs; the inverting input connected to a first reference voltage, VREF1, the operational amplifier having a control output connected to the first and second gates;
   series first and second resistors, R1+R2, through which the scaled mirror current flows creating a feedback voltage across R1+R2 and a compare voltage across R2;
   a comparator having an output and an input connected to the compare voltage;
   a second reference voltage connected to another comparator input; wherein the is second reference defines the predetermined threshold;
   a first single pole switch;
   a second single pole switch;
   an inverter having an input and an output, and
   wherein the inverter output is connected to activate the second switch, and wherein the comparator output is connected to the inverter input and to be able to activate the first switch; wherein one or the other of the first and second switches is activated and the other is not activated, and in the first state the first singly pole switch is activated and the second is not, and
   wherein when the compare voltage does not reach the predetermined threshold, the comparator output activates the first single pole switch that connects a first voltage, that is lower than the first reference voltage, to the operational amplifier non-inverting input, wherein the operational amplifier output drives the first and second transistors on; wherein when the compare voltage reaches the predetermined threshold, the over current protection circuit assumes the second state, and
   wherein, a feedback loop exists where the feedback voltage, generated from the scaled mirror current, connects to the non-inverting operational amplifier input via the second single pole switch, and the operational amplifier output drives the first and second transistors into an analog condition, wherein the load current and the scaled mirror currents are lowered until the feedback signal matches the reference input, and wherein in the second state the final load current equals D(VREF1)/(R1+R2).

10. A over-current protecting method for a load current, the method comprising the steps of:
    scaling a mirror current of the load current;
    generating sense and feedback signals from the mirror current;
    comparing the sense signal to a threshold signal and outputting a compare signal therefrom;
    wherein when the sense signal does not reach the threshold signal, activating a first switch with the compare signal and connecting, via the first switch, a first signal to a first input of a control circuit; wherein the control circuit outputs a control output that turns on a first and a second transistor;
    connecting, via the turned on first transistor, a first supply voltage to an output and drawing a load current via the turned on first transistor;
    drawing the scaled, mirror current of the load current from the first supply voltage via the turned on second transistor and forming a mirror voltage where the scaled mirror current exists the second transistor; and wherein when the sense signal reaches the threshold signal, outputting an over-current signal, that indicates an overload state therefrom;
    wherein when the overload state;
    forming a feedback loop by:
    deactivating the first switch and activating a second switch from the over-current signal; connecting the feedback signal, via the second switch, to the first input of the control circuit;
    the control circuit operating on the feedback signal and the first reference signal, wherein the control circuit output drives the first and the second transistors into an analog condition, and
    lowering the load and scaled mirror currents until the feedback signal matches the first reference signal.

11. The over-current protecting method of claim 10; wherein the step of generating sense and feedback signals from the mirror current includes the steps of:
    flowing the scaled mirror current through a series connection of a first and second resistors, and
    generating the sense and the feedback signals from the voltage drops across the first and second resistors.

12. The over-current protecting method of claim 10; wherein the step of comparing the sense signal to a threshold signal comprises the steps of connecting the sense signal to one input of a comparator and connection another input of the comparator to a threshold signal, wherein when the sense signal traverses the threshold signal, the comparator output signal indicates a corresponding traverse from a first state to a second state, wherein the second state indicates an over-current condition.

13. The over-current protecting method of claim 10, wherein the step of scaling a mirror current includes the step of connecting two transistors in a mirror arrangement and size scaling one transistor with respect to the other.

14. The over-current protecting method of claim 10, wherein the step of comparing the feedback signal to a first reference signal comprises the step of connecting the feedback signal to the non-inverting input of an operational amplifier, and connecting the first reference signal to the inverting input of the operational amplifier, and connecting an output of the operational amplifier to control inputs of the first and second transistors.

15. The over-current protecting method of claim 10; further comprising the steps of:

connecting the output to a non-inverting input of a second operational amplifier;

connecting the mirror voltage to the non-inverting input of the second operational amplifier;

connecting on output of the second operational amplifier to the gate of a third FET, and connecting the source of the third FET to the mirror voltage, and connection the drain of the third FET to the sense circuit; wherein the mirror current is delivered to the sense circuit from the drain of the third FET.

16. The over-current protecting method of claim 10, wherein the steps of activating the first switch and activating the second witch comprise the steps of activating and deactivating, respectively, a single pole double throw switch wherein in the first state the first signal connects to the pole piece of the single pole double throw switch and then to the first input of the control circuit, and when in the second state, via the deactivated switch pole piece of the single pole double throw switch, the feedback signal connects to the first input of the control circuit.

* * * * *